US006909731B2

United States Patent
Lu

(10) Patent No.: US 6,909,731 B2
(45) Date of Patent: Jun. 21, 2005

(54) STATISTIC PARAMETERIZED CONTROL LOOP FOR COMPENSATING POWER AND EXTINCTION RATIO OF A LASER DIODE

(76) Inventor: Cheng Youn Lu, 40926 Canyon Heights Dr., Fremont, CA (US) 94539

( * ) Notice: Subject to any disclaimer, the term of this patent is extended or adjusted under 35 U.S.C. 154(b) by 0 days.

(21) Appl. No.: 10/764,380

(22) Filed: Jan. 22, 2004

(65) Prior Publication Data

US 2004/0165622 A1 Aug. 26, 2004

Related U.S. Application Data

(60) Provisional application No. 60/442,302, filed on Jan. 23, 2003.

(51) Int. Cl.[7] .............................. H01S 3/10; H01S 3/13; H01S 3/00
(52) U.S. Cl. ............................... 372/29.01; 372/29.011; 372/26; 372/24.021; 372/38.1; 372/38.01; 372/38.02; 372/33
(58) Field of Search ............................. 372/26, 29.01, 372/29.011, 29.014, 29.015, 29.021, 29.02, 38.1, 38.01, 38.02, 38.07, 33, 8, 25, 31

(56) References Cited

U.S. PATENT DOCUMENTS 5,754,577 A    5/1998  Casper et al.

2004/0131094 A1 *  7/2004  Miremadi ................ 372/29.02

FOREIGN PATENT DOCUMENTS

EP          1 083 643 A2      3/2001

OTHER PUBLICATIONS

GiGa. product GD16521, 2.5 Gbips re–timing laser driver, pp. 1–13, Feb. 1, 2001.
Summit Microelectronics, Inc., product SML2108, Laser Diode Adaptive Power Controller, pp. 1–21, Oct. 3, 2001.

* cited by examiner

Primary Examiner—Minsun Oh Harvey
Assistant Examiner—Armando Rodriguez
(74) Attorney, Agent, or Firm—Fenwick & West LLP

(57) ABSTRACT

An automatic closed loop power control system is described for simultaneously adjusting an output power and an extinction ratio $P_1/P_0$ of a laser diode in order to maintain a desired average output power and a desired extinction ratio. The bias current component of a laser diode drive current is adjusted to compensate for changes in the average output power caused by ambient characteristics such as temperature and aging. Simultaneously, a modulation current component of the laser diode drive current is adjusted to maintain an extinction ratio of the laser diode output signal. The bias current and modulation current adjustments are based on the second order statistics of an average output power of the laser diode and a variance in the power output of the laser diode.

17 Claims, 9 Drawing Sheets

STATISTIC PARAMETERIZED CONTROL LOOP FOR COMPENSATING POWER AND EXTINCTION RATIO OF A LASER DIODE

CROSS-REFERENCE TO RELATED APPLICATIONS

This application claims priority under 35 U.S.C.§ 119(e) from U.S. provisional patent application 60/442,302, having a filing date of Jan. 23, 2003, entitled "Statistic Parameterized Control Loop for Compensating Power and Extinction Ratio of a Laser Diode," having inventor Cheng Youn Lu, which is hereby incorporated by reference.

FIELD OF THE INVENTION

The present invention relates generally to optical transceivers for use in optical communication systems, and more particularly, to compensating the power and extinction ratio of a laser diode.

BACKGROUND

Laser diodes are typically used in optical transceivers to convert electric current into optical power for data transmission. The laser diode translates the laser current to optical power values $P_1$ and $P_0$, which represent the binary values "1" and "0", respectively. Due to temperature changes and/or laser diode aging, the characteristics of a laser diode in operation will change.

FIG. 1 is a graph that illustrates the temperature dependency of a laser diode transfer function of output optical power P on the vertical axis vs. laser drive current $i_{dd}$ on the horizontal axis. As shown in FIG. 1, when the temperature increases from temperature $T_0$ (e.g. 25° C.) to temperature $T_1$ (e.g. 30° C.) the optical power values $P_1$ and $P_0$ decrease to $P'_1$ and $P'_0$. Consequently, the average optical power $P_{ave}$ decreases as well. These variations in the average optical power and the extinction ratio $P_1/P_0$ during data transmission can reduce the reliability of a digital communication system. For example, such variations can increase the bit error rate (BER) and clock jitter at the receiver end. Also, if the original transmission is set at $P_1'$ and $P_0'$, and the laser temperature is decreased, the transmission power will increase, thereby overdriving the laser diode, which can damage the laser diode, as well as increasing the BER at the receiver. Additionally, as the laser diode ages its ability to efficiently convert electrical power to optical power will decrease causing the extinction ratio $P_1/P_0$ and the average power $P_{ave}$ to change.

To maintain a constant average optical power $P_{ave}$ and extinction ratio $P_1/P_0$ over a wide range of operating temperatures and over a long period of time, a laser drive current $i_{dd}$ comprising laser bias current $i_b$ and a modulation current $i_m$ is preferably adjusted to compensate for changes in the characteristics of the laser diode due to temperature changes and aging. The laser bias current drives the laser diode to a direct current operating point. The modulation current provides a switching current which varies the input data signal and has an amplitude that produces a prescribed peak-to-peak variation in the optical output power of the laser diode. As shown in FIG. 1, the binary digit "0" is transmitted if the laser drive current $i_{dd}=i_b(0)$ mA at temperature $T_0$, while the binary digit "1" is transmitted if the laser drive current $i_{dd}=i_b(0)+i_m(0)$ mA at temperature $T_0$, where $i_b(0)$ and $i_m(0)$ are the laser bias current and the modulation current, respectively. As further illustrated in FIG. 1, the correct bias current $i_b$ and modulation current $i_m$ for temperature $T_1$ should be $i_b(1)$ and $i_m(1)$, rather than $i_b(0)$ and $i_m(0)$, to maintain the same extinction ratio $P_1/P_0$ and average optical power $P_{ave}$.

There are three conventional approaches to controlling the bias current $i_b$ and the modulation current $i_m$ of a laser diode to maintain a constant average power $P_{ave}$ and extinction ratio $P_1/P_0$.

The first approach is based on a model of linearized laser characteristics. In this approach, the bias current $i_b$ is adjusted while maintaining a constant modulation current $i_m$, until the average optical power $P_{ave}$ is equal to a predefined value $P_{ref}$. $P_{ref}$ is the reference average output power from the laser diode at the desired $P_1$ and $P_0$ levels. $P_{ref}=(P_1+P_0)/2$. $P_{ref}$ is the mean of $P_{ave}$. The modulation current $i_m$ is then adjusted while measuring the slope efficiency K, which is defined as the change in power P over the change in laser drive current $i_{dd}$ ($\Delta P/\Delta i_{dd}$). The modulation current $i_m$ is adjusted until $\Delta P$ is equal to a predefined $\Delta P_{ref}$.

FIG. 2 is a graph illustrating a linearized laser diode transfer function. Since $\Delta P/\Delta i_m=(P_1-P_0)/i_m$, for a given $\Delta P_{ref}$ (e.g. $\Delta P_{ref}=0.05*(P_1-P_0)$), if $\Delta P<\Delta P_{ref}$, for example, then $\Delta i_m$ should be increased, correspondingly since $\Delta i_m=0.05\, i_m$, so $i_m$ increases as well. Since $\Delta i_m$ increased, $\Delta P$ will be larger, until $\Delta P=\Delta P_{ref}$. At this point, $i_m$=desired $i_m$, and the extinction ratio $P_1/P_0$ as well as the average power $P_{ave}$ is set to the desired level. Especially for higher temperatures, the method described above often yield a higher extinction ratio then the desired level because the power-current (P-I) characteristics of a practical laser diode are nonlinear.

FIG. 3 is a block diagram of a conventional system using an automatic power control (APC) loop that can be used in the first approach to implement the control loop described with respect to FIG. 2. FIG. 3 comprises a monitor photodiode (MPD) module 404 including a photodiode 407, a laser diode (LD) 402, and an automatic power control (APC) control circuit 310. The photodiode 407 is preferably coupled back-to-back and closely spaced apart from the laser diode (LD) 402 so that it receives a portion of the output optical power emitted from the LD 402. The MPD module 404 converts the optical output power into electric current $i_p$ having a proportional relationship to the optical output power. FIG. 3 also provides an illustrative context for a second approach for adjusting the modulation current $1_m$ based on information extracted from the variation of the measured current $i_p$. There are various methods for estimation of the optical signal extinction ratio in this approach. For example, detecting the current peak level can be used or using a square-law portion of the transfer function of an RF diode can be used to process the measured MPD current for extinction ratio adjustment.

A third approach uses a look-up table (LUT) based on temperature reading to adjust $i_b$ and $i_m$. This approach, however, is labor intensive, due to the requirement to measure the laser diode P-I characteristics device by device. This approach can also provide inaccurate adjustments to the extinction ratio $P_1/P_0$ because the reading from LUT will not be accurate if the LD characteristics of the laser diode change over time, for example, in case of LD aging.

The three conventional approaches described above are either too labor intensive (e.g., the LUT approach) or fail to meet restrictive requirements in some applications in which the variation of the average power and extinction ratio are limited within a fractional dB of the required targeted level over a wide range of temperature variations (e.g., in the range of −45° C. to 85° C.).

Accordingly, there is a need for an improved technique for maintaining a desired average power $P_{ave}$ and extinction ratio $P_1/P_0$ of a laser diode over a wide range of temperature variations and through device aging, while eliminating the labor intensive measurements associated with conventional LUT techniques.

SUMMARY OF THE INVENTION

The present invention overcomes the deficiencies of conventional techniques by providing embodiments using automatic closed loop power control for adjusting an output power and an extinction ratio $P_1/P_0$ of a laser diode based on second order statistics including an average power $P_{ave}$ and a variation from the average power. An advantage of the present invention over conventional LUT approaches is that it is a closed loop method, which compensates for variations in the laser P-I characteristics caused by factors such as temperature or aging during operation, eliminates the labor intensive process of pre-computing compensation values for stocking the LUT. This can result in a reduction in labor costs as well as an increase in performance reliability.

In one embodiment, the laser diode drive current includes components of a bias current $i_b$ and a modulation current $i_m$, and an automatic power control module adjusts the bias current $i_b$ and modulation current $i_m$ simultaneously based on the second order statistics. One advantage of the simultaneous adjustment is that it minimizes the fluctuation of the laser output power and the extinction ratio during the adjustment of $i_b$ and $i_m$. This is an improvement over conventional techniques which adjust the average power and extinction ratio in a sequential fashion via a state machine or by setting a separate control loop with a different time constant for the bias current $i_b$, and the modulation current, $i_m$ and then slow down one loop or the other to achieve a sequential adjustment.

The one or more embodiments of the present invention can also be embodied as instructions stored or transmitted in one or more computer-usable mediums some examples of which are a memory, a disk, a compact disc, a field programmable gate array, a flash card, a digital signal processor or an integrated circuit. The one or more embodiments of the present invention can also be embodied as software in a computer program product.

DETAILED DESCRIPTION OF THE INVENTION

Figure 1:
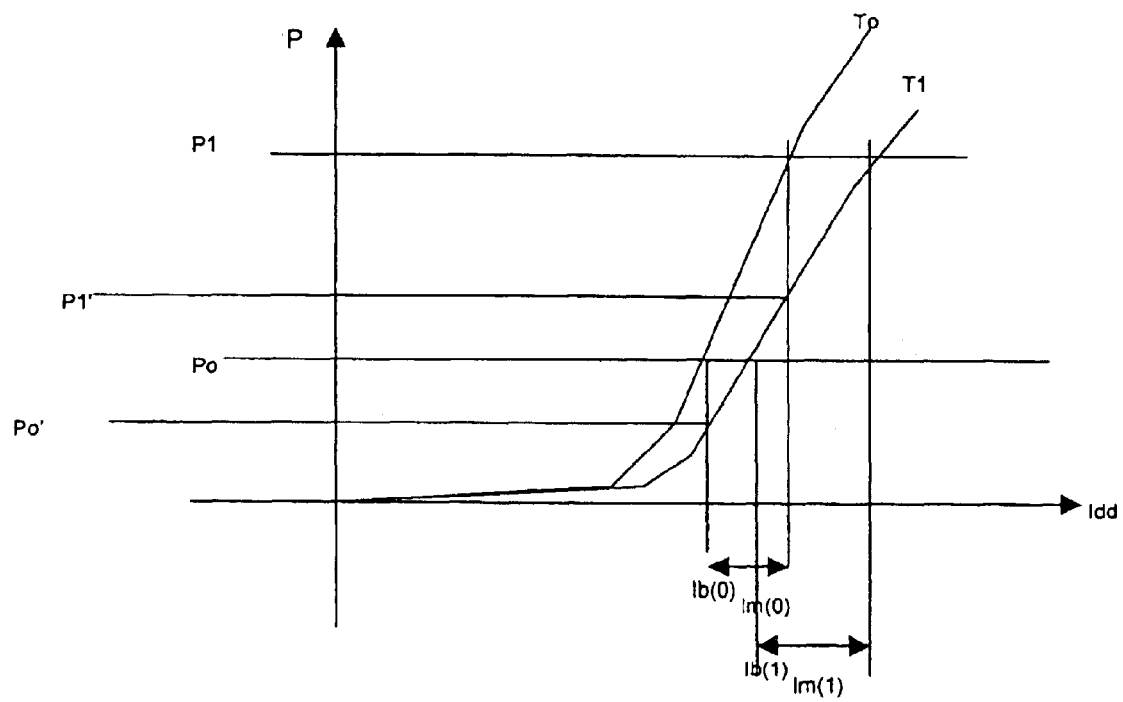
FIG. 1 is a graph that illustrates the temperature dependency of a laser diode transfer function of output optical power vs. laser diode drive current.
Figure 2:
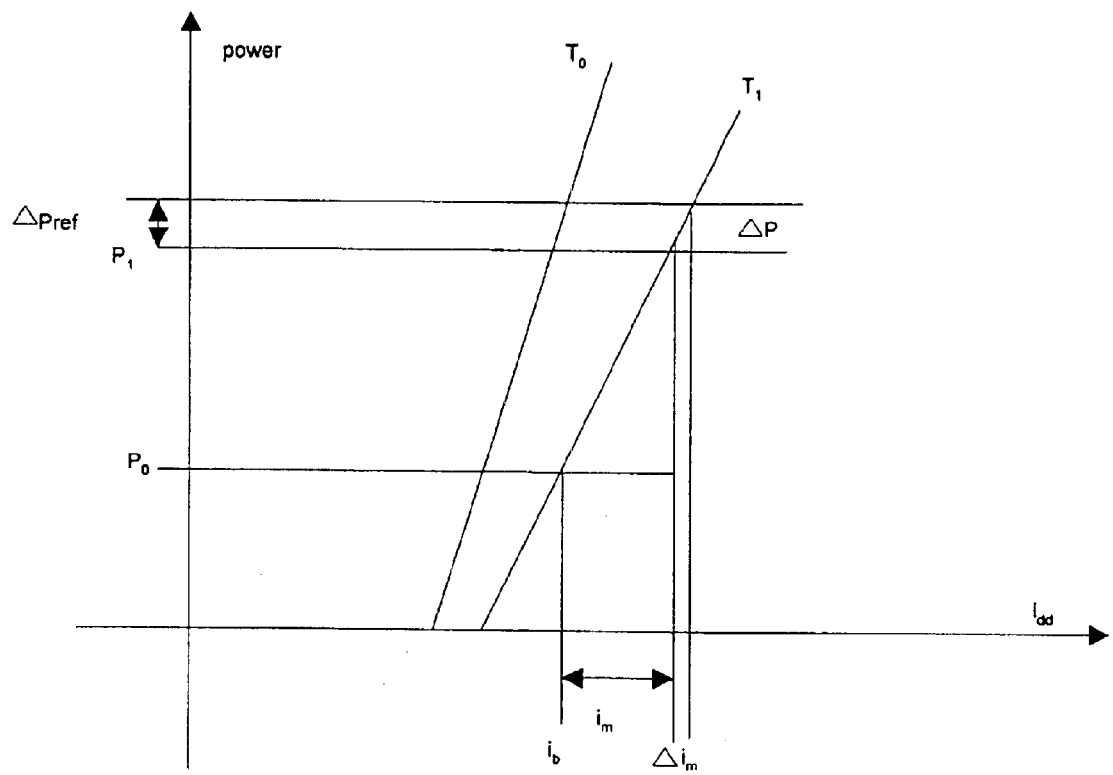
FIG. 2 is a graph illustrating a linearized laser diode transfer function of output optical power vs. laser diode drive current.
Figure 3:
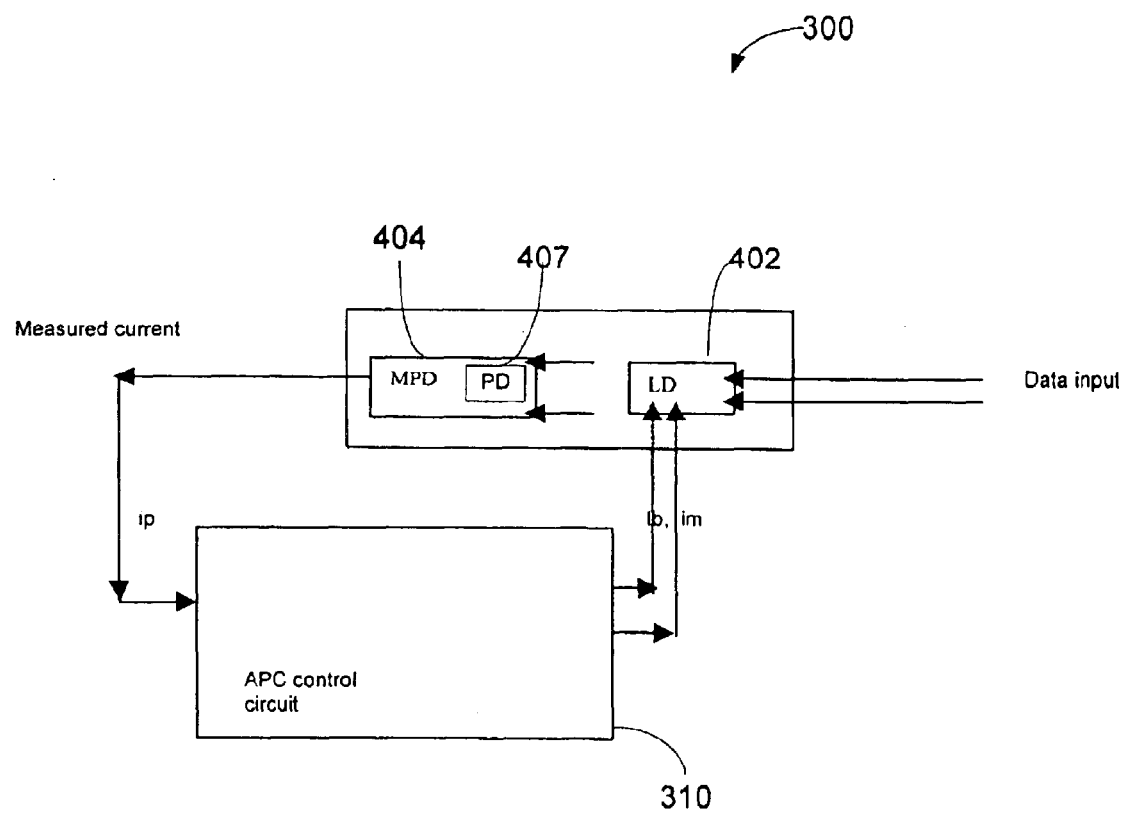
FIG. 3 is a block diagram of a circuit including an automatic power control (APC) loop.
Figure 4:
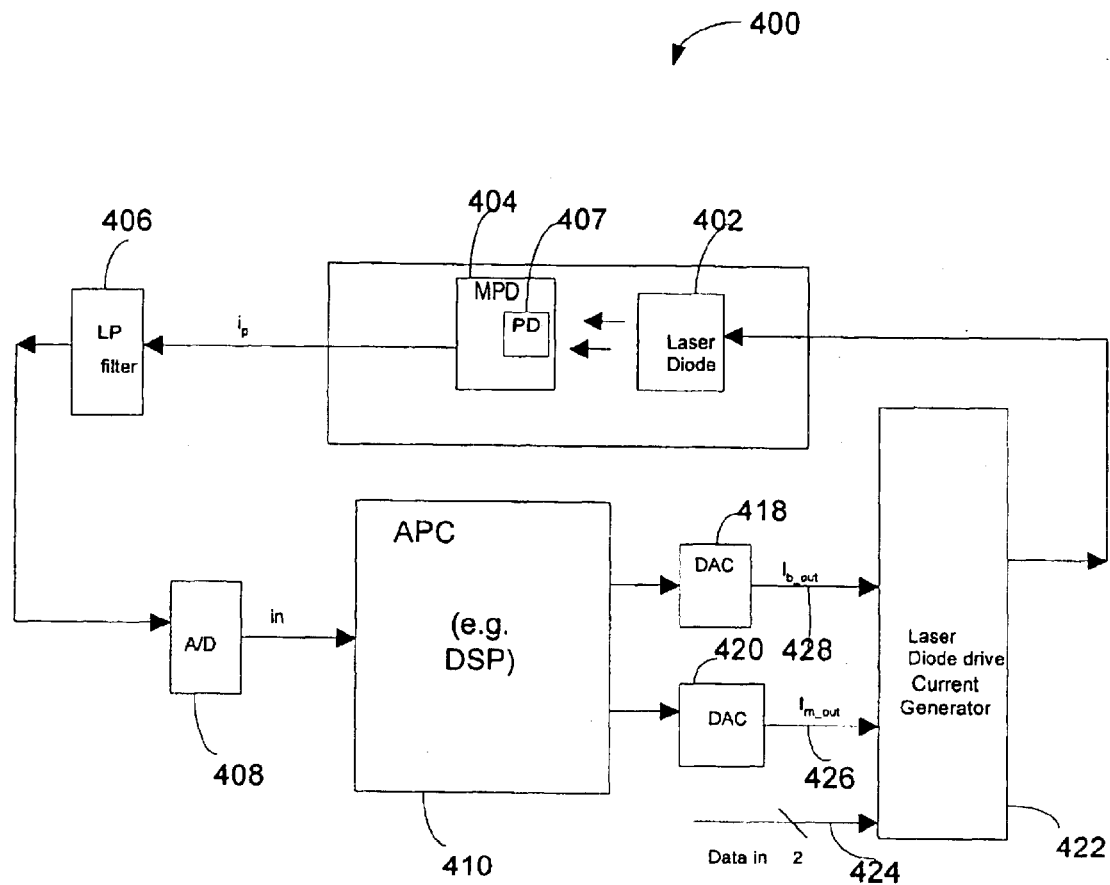
FIG. 4 is a block diagram of a circuit comprising an automatic power control system for simultaneously adjusting an output power and an extinction ratio of a laser diode based on a reference average power and a variation from the reference average power in accordance with an embodiment of the present invention.

FIG. 4 is a block diagram of a circuit 400 comprising an automatic power closed loop control system 410 ("APC") for simultaneously adjusting an output power and an extinction ratio of a laser diode based on a reference average power and a variation from the reference average power in accordance with an embodiment of the present invention. The circuit 400 comprises a laser diode 402, a monitor photodiode (MPD) module 404 including a monitor photodiode (PD) 407, a low-pass filter 406, an analog to digital converter (AD) 408, the APC 410, a first digital to analog converter (DAC) 418 for producing an analog bias current output signal $i_{b\_out}$ 428, a second digital to analog converter (DAC) 420 for producing an analog modulation current output signal $i_{m\_out}$ 426, and a laser diode drive current generator 422 for receiving the produced bias current output signal 428 and the modulation current output signal 426.

The monitor photo diode (MPD) module 404 is communicatively coupled to the laser diode 402 to receive a portion of its emitted light. The PD 407 and LD 402 are preferably coupled back-to-back so that they are closely spaced to reduce signal loss so that the MPD module 404 output $i_p$ represents as closely as possible the power output of the laser diode 402. The MPD module 404 and the LD 402 can be packaged on the same off-the-shelf chip. The MPD module 404 converts the portion of light received by the PD 407 into an electric current $i_p$. The measured current $i_p$ is proportional to the average power of the optical power emitted from the LD 402. The lowpass filter 406 is communicatively coupled to the MPD module 404 to receive the output electrical current signal $i_p$ which it filters to attenuate high frequency noise. The AD converter 408 is communicatively coupled to the low pass filter 406 to receive the filtered MPD current signal $i_p$ and convert it to digital data representing an average power measurement value (e.g. AD_in(n)).

The AD 408 is communicatively coupled to the APC system 410 which receives the digital data representing the average power measurement value. One or more of the elements of the system may be embodied in hardware, firmware, software or any combination of these. An example of one embodiment is a digital signal processor (DSP). The APC 410 is preferably implemented in a (DSP) chip for determining and adjusting simultaneously the bias current $i_b$ and the modulation current $i_m$ based upon the received digital data. The DSP can be implemented as a reconfigurable state machine, a DSP engine, or an ASIC.

Additionally, although elements are depicted as individual units, the elements can be implemented in various combinations of their features as well. The low pass filters 510, 512 are preferably implemented in a DSP chip, so that the filter parameters (e.g. filter order, filter structure (e.g., IIR, FIR)) can be changed to suit the application.

The APC 410 comprises logic for determining the bias current $i_b$ and the modulation current $i_m$ for a desired predetermined "1" level $P_1$ and a desired predetermined "0" level $P_0$. The APC 410 further comprises logic for determining a reference average power and a reference power output variance for the predetermined $P_1$ and $P_0$ levels. The APC 410 further comprises logic for adjusting simultaneously the bias current $i_b$ and the modulation current $i_m$ based on the second order statistics for maintaining a desired average output power $P_{ave}$ and extinction ratio in accordance with an embodiment of the present invention The APC 410 outputs digital data representing either a bias current value or a change in the current bias current value driving the LD 402 to the communicatively coupled DAC 418 whose analog output is communicatively coupled to drive the laser diode driver current generator 422. The APC 410 outputs digital data representing either a modulation current value or a change in the current modulation current value driving the LD 402 to the communicatively coupled DAC 420 whose analog output signal $i_m$ 426 is communicatively coupled to drive the laser diode driver current generator in conjunction with the bias current output signal $i_b$ 428.

Figure 5:
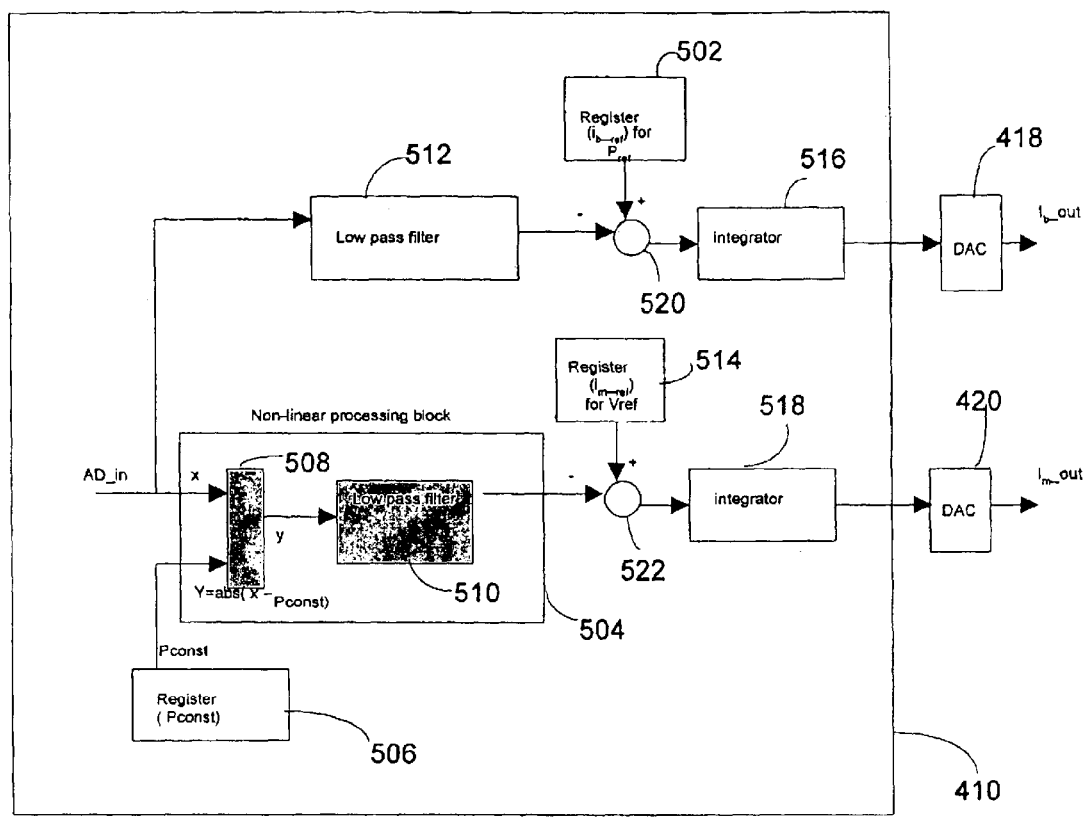
FIG. 5 illustrates logic for implementing an automatic power control system in a digital signal processor in accordance with an embodiment of the present invention.

FIG. 5 illustrates logic for implementing an automatic power control system 410 in a digital signal processor in accordance with an embodiment of the present invention. The logic comprises a low pass filter 512, a memory location illustrated as a register 502 storing a bias current reference value ib_ref corresponding to the average power reference $P_{ref}$, a difference determination logic unit 520, and an integrator 516, a non-linear processing block 504 including logic 508 for adding the measurement value AD_in(n) and an absolute value of the measurement value adjusted by a nonlinear estimation reference constant, $P_{const}$ and a low pass filter, a memory location, in this case a register 507 for storing the nonlinear estimation reference constant, a memory location illustrated as a register 514 storing a modulation current reference value $i_{m\_ref}$ corresponding to the average power reference $P_{ref}$, a difference determination logic unit 522, and an integrator 518.

The lowpass filter 512 is communicatively coupled for receiving the measured digital data value AD_in(n), and filtering it to remove high frequency components. The difference determination logic unit 520 is communicatively coupled to receive the filtered measured data. It determines the difference between the filtered measured value AD_in (n) representative of the average output power of the laser diode 402 and a reference bias current value $_{ib\_ref}$ representative of the desired reference average power $P_{ref}$. The difference output is communicated to the integrator 516 which provides a feedback component of historical data for the adjustment of the bias current output signal $i_{b\_out}$ in digital form which is forward to DAC 418.

Logic 508 of the non-linear processing logic block 504 is communicatively coupled to receive and add the measurement value AD_in(n) and an absolute value of the measurement value adjusted by a nonlinear estimation reference constant, $P_{const}$ accessed from register 506. $P_{const}$ is a predetermined constant based on the characteristics of the particular laser diode. For example, $P_{const}$ can be provided by the manufacturer of the diode. In another example, $P_{const}$ a previous input AD_in(n−1). The low pass filters are preferably implemented in a DSP chip, so that the filter parameters (e.g. filter order, filter structure (e.g., IIR, FIR)) can be changed to suit the application.

The lowpass filter 510 is communicatively coupled for receiving the computed output from the logic 508 and filtering it to remove high frequency components. The difference determination logic unit 522 is communicatively coupled to receive the filtered computed data representative of the variation of the measured data from the average output power as an indicator of the extinction ratio. It determines the difference between the filtered computed value and a reference modulation current value$_{im\_ref}$ representative of the reference power output variance $V_{ref}$ for predetermined desired $P_1$ and $P_0$ levels. The difference output is communicated to the integrator 518 which provides a feedback component of historical data for the adjustment of the modulation current output signal $i_{m\_out}$ in digital form which is forward to DAC 420.

Figure 6:
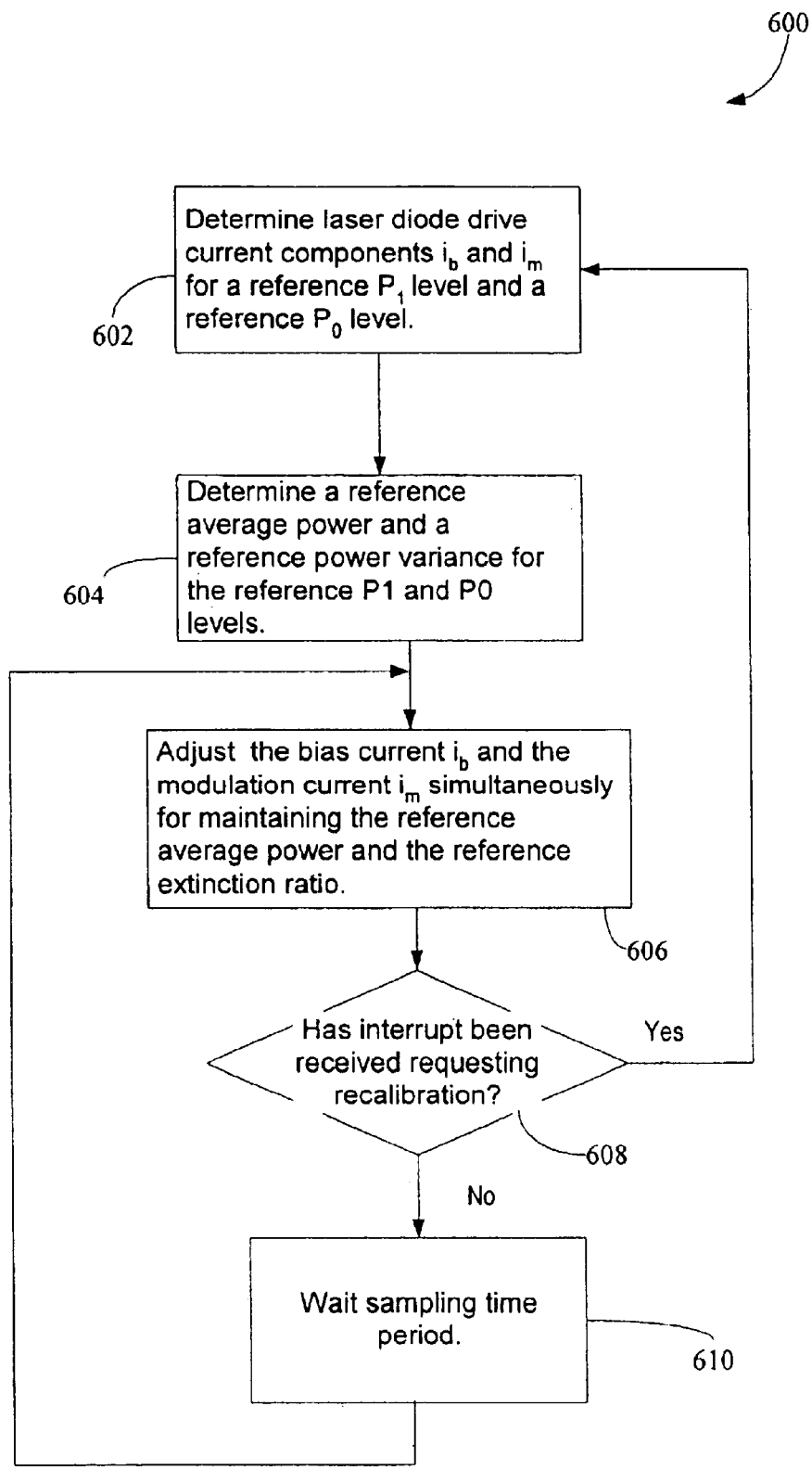
FIG. 6 is a flow diagram illustrating a method for simultaneously adjusting an output power and an extinction ratio of a laser diode based on on a reference average power and a variation from the reference average power in accordance with an embodiment of the present invention.

FIG. 6 is a flow diagram illustrating a method 600 for simultaneously adjusting an output power and an extinction ratio of a laser diode based on on a reference average power and a variation from the reference average power in accordance with an embodiment of the present invention. For illustrative purposes only, the method embodiment 600 illustrated in FIG. 6 is discussed in the context of the system embodiment of FIG. 4.

When the laser diode is powered-on or a recalibration request is received, the laser diode's drive current is calibrated for the desired reference $P_1$ and $P_0$ levels. In one example, these reference $P_1$ and $P_0$ levels can be set according to an average output power and extinction ratio for optimal reception at a receiver (not shown) across a transmission medium. The APC 410 determines 602 the laser diode drive current $i_{dd}$ for a reference $P_1$ and a reference $P_0$ level. The APC 410 determines 604 a reference average power and a reference power variance for the reference $P_1$ and $P_0$ levels. The APC 410 adjusts 606 the bias current $i_b$ and the modulation current $i_m$ simultaneously for maintaining the reference average power and the reference extinction ratio indicated by the reference $P_1$ and $P_0$ levels. If the APC 410 receives 608 an interrupt requesting recalibration, the APC 410 returns control to the calibration processing which would repeat the determination 602 of the drive current $i_{dd}$ components $i_b$ and $i_m$ for reference $P_1$ and $P_0$ levels. Responsive to no interrupt being received 608, the APC 410 waits 610 a sampling time period before repeating the adjusting 606 of $i_b$ and $i_m$ simultaneously.

For illustrative purposes only, the method embodiments of FIGS. 7, 8 and 9A and 9B are discussed in the context of the system embodiments of FIGS. 4 and 5. For the discussion of FIGS. 7, 8 and 9A and 9B, the following short hand notations are used.

$P_1$, $P_0$: the laser output power at desired level "high" or "low", which are corresponding to input data "1", or "0";

$P_{ave}$: the measured, by monitor photo diode, the average output power from laser diode;

$P_{ref}$: reference average output power from laser diode. $P_{ref}=(P_1+P_0)/2$;

$V_{ref}$: a reference power output variance from the reference average output power representative of the reference $P_1$ and $P_0$ levels for the desired extinction ratio $P_1/P_0$ of the optical power emitted from the laser diode;

AD_in: measured data at AD converter input (see FIG. 4)

$i_b\_out$: bias level at the output of the APC 410, which is proportional to the laser drive bias current;

$i_m\_out$: modulation level at the output of APC, proportional to the laser modulation current.

calib_T: the time period for laser initial setting (settle desired $i_b$ and $i_m$ such that the laser output power can be at $P_1$, as "1", and $P_0$, as "0";

Par_T: the time period for $P_{ave}$, and $V_{ref}$ estimation $g\_i_b$: loop gain for adjusting the laser bias current or adjust laser drive current for laser initial setting $g\_i_m$: loop gain for adjusting the laser modulation current $P_{const}$: reference value for nonlinear estimation loopgain_cal: loop gain value used during calibration of the laser diode drive current $i_{dd}$ components for the reference $P_0$ and $P_0$ levels.

Figure 7:
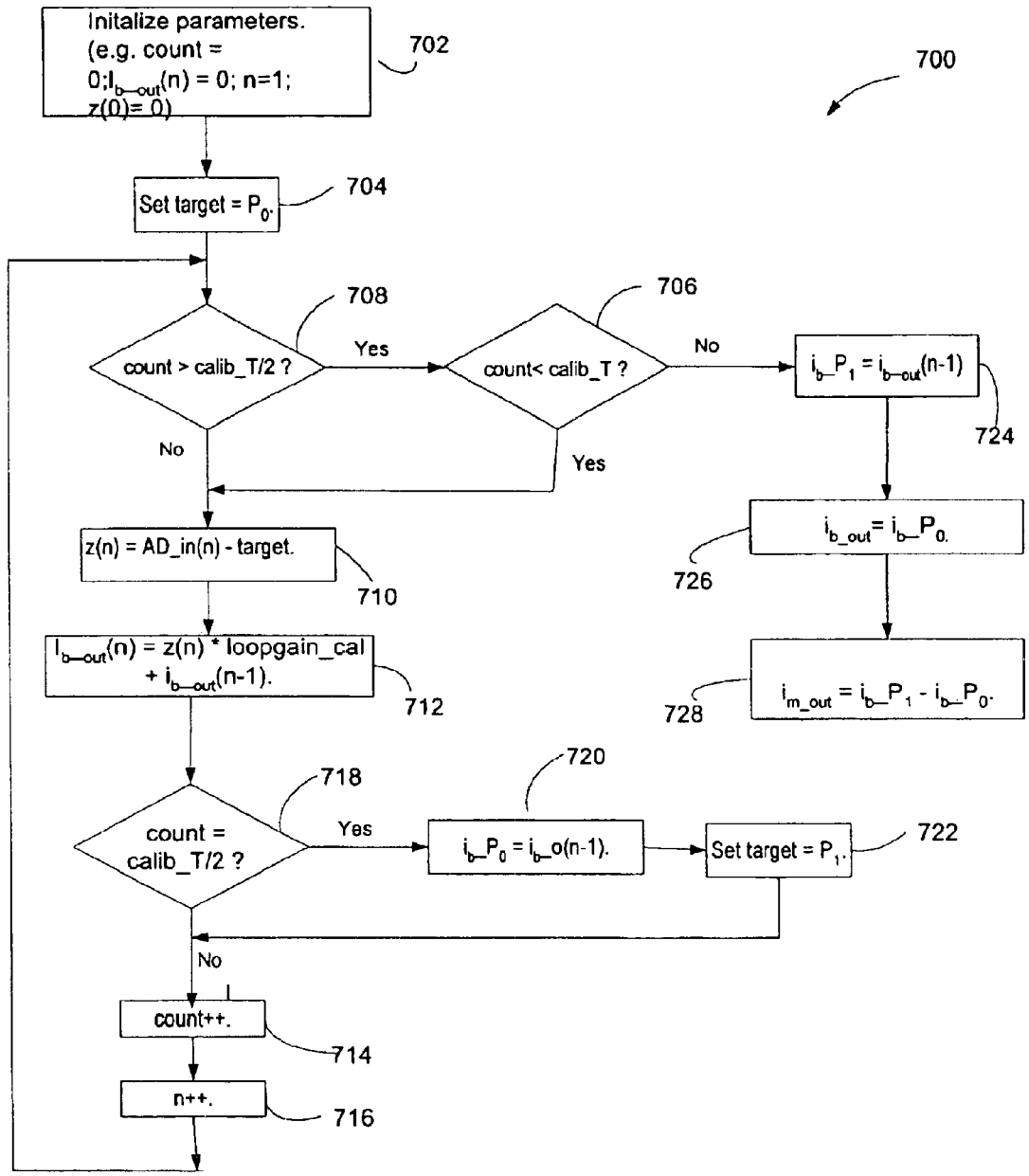
FIG. 7 is a flow diagram of a method 700 for calibrating initial bias current and modulation current components of a laser diode drive current for the desired reference $P_0$ and $P_1$ power levels in accordance with an embodiment of the present invention.

(n): processing for the current measured data is being performed $ib\_P_0$: bias current level which is proportional to the laser drive bias current component for the predetermined reference $P_0$ power level $i_m\_P_0$: modulation level which is proportional to the laser drive modulation current component for the predetermined reference $P_0$ power level $i_b\_P_1$: bias current level which is proportional to the laser drive bias current component for the predetermined $P_1$ power level $i_m\_P_1$: modulation level which is proportional to the laser drive modulation current component for the predetermined $P_1$ power level FIG. 7 is a flow diagram of a method 700 for calibrating initial bias current and modulation current components of a laser diode drive current for the desired reference $P_0$ and $P_1$ power levels in accordance with an embodiment of the present invention. In an initial calibration phase, the goal is to set the laser diode with the properly adjusted bias current $i_b$ and modulation current $i_m$ to settle the optical power output from the laser diode at the desired $P_1$, as "1", and $P_0$, as "0". The illustrated method embodiment 700 uses a power adjustment feedback loop for the sequential setting of $P_0$ followed by $P_1$, wherein $P_0$ corresponds to the laser bias current $ib\_out$ and P1 corresponds to the current ($i_b\_out + i_m\_out$). In this method embodiment 700, the determination of the initial bias current and initial modulation current is determined based on the calibration of the bias current output signal $i_b\_out$ 428.

The APC 410 initializes 702 parameters for the initialization stage. A count of seconds starts at zero. The initial bias current $i_b\_out$ is set to zero as is intermediate calculation parameters, e.g. x(0)=0. The iteration counter n representing the nth measured data value being processed is initialized at 1. The APC 410 sets 704 a first target output value to $P_0$. For example, in FIG. 5, register 502 can store the target value. Responsive to determining 708 that the time represented by count has not exceeded half the calibration time, calib_T/2, the difference determination unit 520 determines 710 the difference of the measured value from the desired target $P_0$ value, z(n) =AD_in(n)−target. This difference is multiplied 712 by loopgain_cal and integrator 516 sums 712 the result with a feedback component of the previous iteration, $i_b\_out$ (n−1) providing for closed loop control of the power output of the laser diode. Responsive to determining the time as represented by count is not equal to calib_T/2, the time count is incremented 714, count++ and the measurement iteration counter n is incremented 716, n++. Control returns to the determination 708 of whether calib_T/2 has been exceeded and the subsequent processing dependent on the result of that determination. Responsive to the count=calib_T/2, the initial bias current for $P_0$, $i_b\_P_0$ is set 720 to the bias current output for the current iteration $i_b\_out$(n), and the target is set 722 to $P_1$. The time count is incremented 714, count++ and the measurement iteration counter n is incremented 716, n++. Control returns to the determination 708 of whether calib_T/2 has been exceeded and the subsequent processing dependent on the result of that determination.

Responsive to determining 708 that calib_T/2 has been exceeded, it is determined 706 whether the time period has reached the calibration time period end calib_T. Responsive to count<calib_T, the processing 710, 712, 718, 714, 716 based on the next measured value AD_in(n) continues. Responsive to determining 708 that calib_T is not less than calib_T, the initial bias current output for $P_1$, $i_b\_P_1$ is set to the bias current output for the current iteration $i_b\_out$(n). The bias current $i_b\_out$ is initialized 726 to the bias current for the $P_0$ level, $i_b\_out = i_b\_P_0$, and the modulation current $i_m\_out$ is initialized 728 to the difference in the bias current for $P_1$ and $P_0$, $i_m\_out = i_b\_P_1 - i_b\_P_0$.

Figure 8:
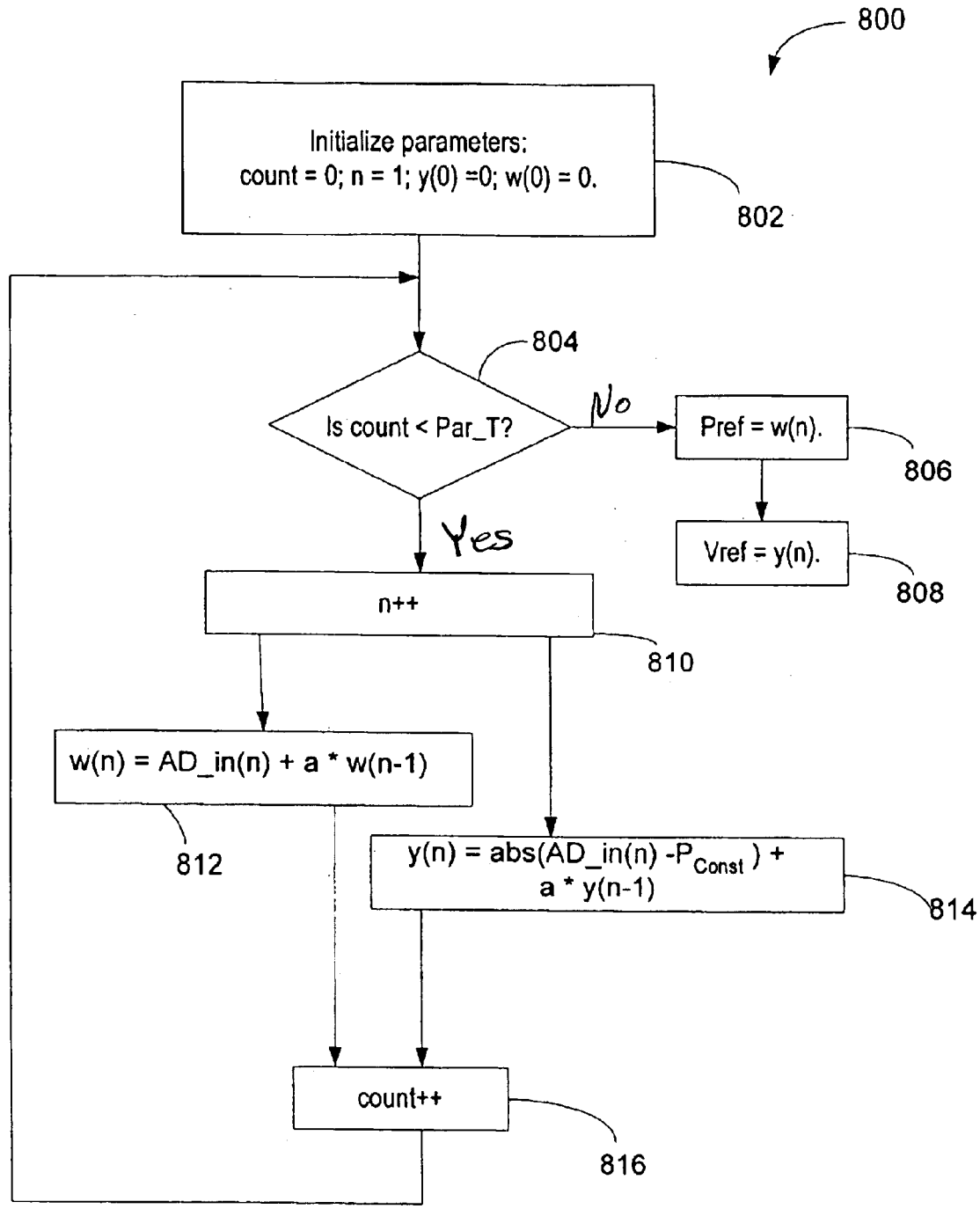
FIG. 8 is a flow diagram of a method for determining a reference average power $P_{ref}$ and a reference power output variance $V_{ref}$ for predetermined desired $P_1$ and $P_0$ levels in accordance with an embodiment of the present invention.

FIG. 8 is a flow diagram of a method 800 for determining a reference average power $P_{ref}$ and a reference power output variance $V_{ref}$ representative of the reference $P_1$ and $P_0$ levels for the desired extinction ratio $P_1/P_0$ in accordance with an embodiment of the present invention. This method embodiment 800 is typically performed during a parameter estimation phase following the initial calibration phase when the laser diode transmitter 402 is initially powered on.

In the example context of the system embodiment 400 illustrated in FIG. 4, using the initial values for $i_b\_out$ and $i_m\_out$ determined in the calibration phase, a random data input (e.g. 424) is provided to the laser diode drive current generator 422 causing the laser diode 402 to produce an optical power swing from corresponding power levels $P_0$ and $P_1$ over a parameter estimation time period Par_T. The values $P_{ref}$ and $V_{ref}$ are then estimated, and used by the APC 410 for adjusting parameters such as the laser diode drive current $i_{dd}$ effecting the laser optical power extinction ratio and average power level to maintain the desired level in an extinction ratio and power level compensation phase. Particularly for a laser diode 402 used as a transmitter, the extinction ratio and power level are monitored continuously during normal transmitter operation and parameters are adjusted responsive to the monitored feedback.

The APC 410 initializes 802 parameters for the power parameter estimation phase for setting $P_{ref}$ and $V_{ref}$. $P_{ref}$ and $V_{ref}$ are initialized to zero. A count of seconds starts at zero. Intermediate calculation parameters are initialized to zero, e.g. y(0)=0 and w(0)=0. The iteration counter n representing the nth measured data value being processed is initialized at 0. The APC 410 determines 804 if the time represented by count is less than the parameter estimation time period. Responsive to count<Par_T, the measurement iteration counter n is incremented 810, n++. For the same measured data value (n), an intermediate parameter w(n) representing an iteration in the closed loop determination of $P_{ref}$ and an intermediate parameter y(n) representing an iteration in the closed loop determination of $V_{ref}$ can be processed 812, 814 in parallel in the context of the logic embodiment illustrated in FIG. 5. In the example logic of FIG. 5, the measured data value for this iteration AD_in(n) is received from the low pass filter 512 and is not altered by the difference determination unit 520 as $P_{ref}$ is zero. Integrator 516 sums 812 AD_in(n) with a feedback component of the previous iteration, a*w(n−1) multiplied by a gain factor,: w(n)=AD_in(n)+a*w(n−1), where 0<a<1.0, e.g. a=0.99. For the same iteration (n), logic 508 of the non-linear processing logic block 504 determines 814 the absolute value of the difference between the measurement value AD_in(n) and a nonlinear estimation reference constant, $P_{const}$ accessed from register 506, y(n)=abs(AD_in(n)−$P_{Const}$). Integrator 518 sums 814 the absolute difference y(n) with a feedback component of the previous iteration, a*y(n−1) multiplied by a gain factor a where 0<a<1.0, e.g. a=0.95.

The time count is incremented 816, count++, and control returns to the determination 804 of whether Par_T has been reached or exceeded and the subsequent processing dependent on the result of that determination. Responsive to count not being <Par_T, $P_{ref}$ is set to the current iteration w(n), and $V_{ref}$ is set to the current iteration of the y(n).

Figures 9A, 9B:
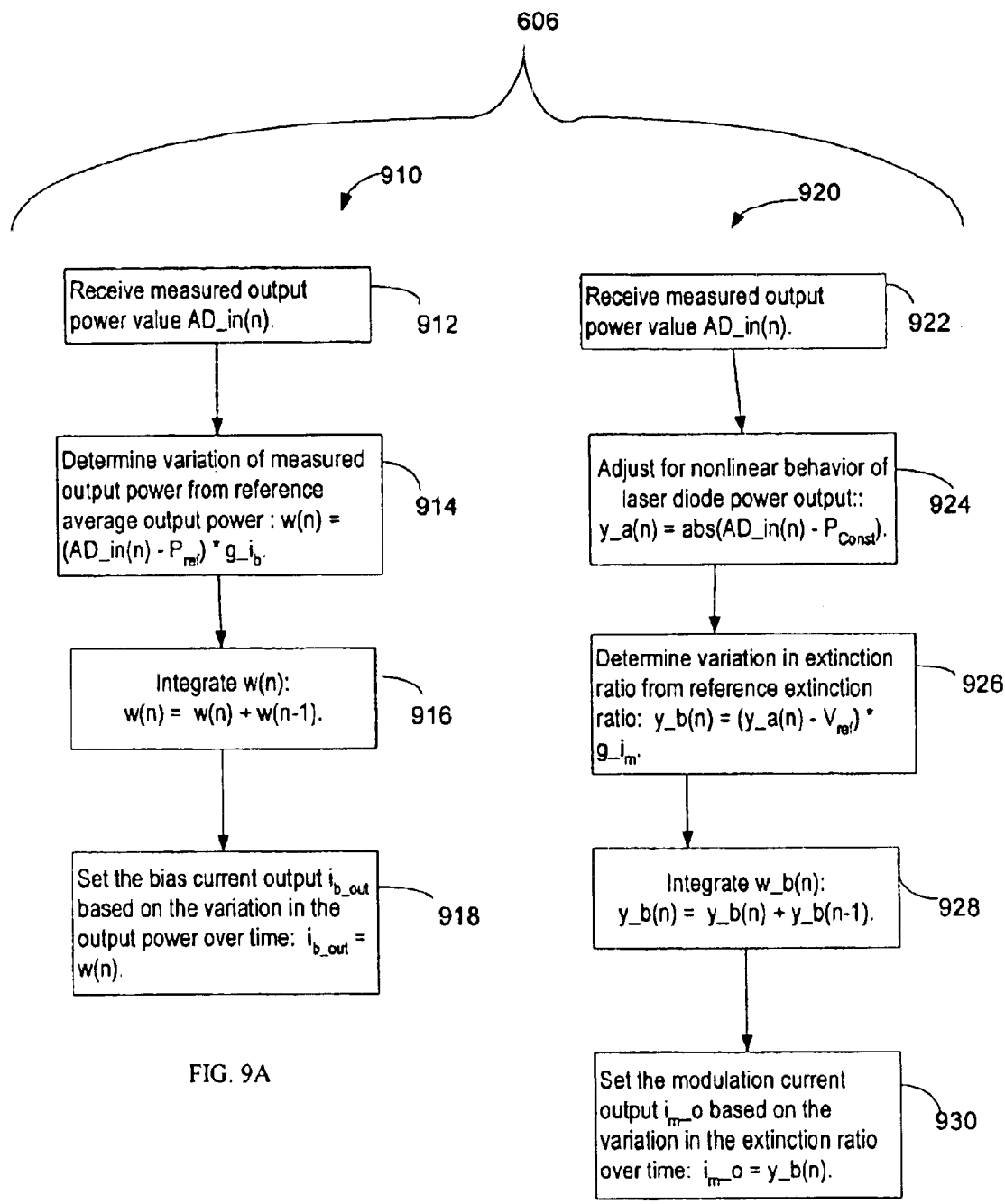
FIG. 9A is a flow diagram of a method for adjusting the bias current $i_b$ based on an average output power measurement value and the reference average power $P_{ref}$ in accordance with an embodiment of the present invention.
FIG. 9B is a flow diagram of a method for adjusting the modulation current $i_m$ based on an average output power measurement value, a nonlinear estimation power reference value and a reference power output variance $V_{ref}$.

FIG. 9A is a flow diagram of a method 910 for adjusting the bias current $i_b$ based on an average output power measurement value and the reference average power $P_{ref}$ in accordance with an embodiment of the present invention. FIG. 9B is a flow diagram of a method 920 for adjusting the modulation current $i_m$ based on an average output power measurement value, a nonlinear estimation power reference value and a reference power output variance $V_{ref}$. In the illustrative context of the logic of FIG. 5, the bias current and modulation current are adjusted simultaneously for the same measured data value AD_in(n). For illustrative purposes only, the methods of FIGS. 9A and 9B are discussed in the context of the logic embodiments of FIGS. 4 and 5.

The APC 410 receives 912 the measured output power value AD_in(n) from A/D converter 408. In the context of FIG. 5, low pass filter 512 removes high frequency components from AD_in(n), and difference determination unit 520 determines 914 the variation of the measured output power AD_in(n) from the reference average output power $P_{ref}$ and multiplies the result by g_$i_b$, a loop gain for adjusting the bias current: w(n)=(AD_in(n)−$P_{ref}$)*g_$i_b$. Integrator 516 integrates w(n) by summing the current value of w(n) with a feedback component of the previous iteration w(n−1): w(n)=w(n)+w(n−1). The integrator 516 sets 918 the bias current output $i_{b\_out}$ based on the variation in the output power over time: $i_{b\_out}$=w(n).

For the same AD_in(n), nonlinear processing logic block 504 also receives 922 the measured output power value AD_in(n). Logic 508 adjusts 924 for nonlinear behavior of the laser diode power output by determining 924 the absolute value of the difference between the measurement value AD_in(n) and the nonlinear estimation reference constant $P_{const}$ accessed from register 506, y_a(n)=abs(AD_in(n)−$P_{const}$). The difference determination unit 522 determines 926 the variation in the extinction ratio of the laser diode from the reference extinction ratio by substracting the reference output variance $V_{ref}$ from y_a(n) and multiplies the result by g_$i_m$, a loop gain for adjusting the modulation current: y_b(n)=(w_a(n)−$V_{ref}$)*g_$i_m$. Integrator 518 integrates y_b(n) by summing the current value of $y_{13}$ b(n) with a feedback component of the previous iteration y_b(n):y_b(n)=y_b(n)+y_(n−1). The integrator 518 sets 930 the modulation current output $i_{m\_out}$ based on the variation in the extinction ratio over time: $i_{m\_out}$=y_b(n). Referring back to the example of FIG. 6, the simultaneous adjustment of the bias current and modulation current occurs continuously during normal transmission.

What is claimed is:

1. An automatic power control system for simultaneously adjusting an output power and an extinction ration of a laser diode comprising:
   a bias current determination unit including:
      a first difference determination unit for determining an average power difference between a current measurement of an output power of the laser diode and a reference average output power, and
      a first integrator communicatively coupled to receive the determined average power difference from the first difference determination unit, the first integrator summing the determined average power difference with a determined average power difference based on at least one previous measurement by the first difference determination unit resulting in a bias current output signal; and
   a modulation current determination unit including:
      a nonlinear processing block for determining an absolute value of the current measurement adjusted by a nonlinear estimation reference constant,
      a second difference determination unit communicatively coupled to the nonlinear processing block for determining a power variance difference between the determined absolute value and a reference power output variance proportional to an extinction ratio $P_1/P_0$ for reference power levels $P_1$ and $P_0$ wherein $P_1$ represents a digital one value and $P_0$ represents a digital zero value, and
      a second integrator, communicatively coupled to receive the determined power variance difference from the second difference determination unit, the second integrator summing the determined power variance difference with a determined power variance difference based on at least one previous measurement by the second difference determination unit resulting in a modulation current output signal.

2. The system of claim 1 wherein the bias current determination unit further comprises a low pass filter for filtering high frequency noise from the current measurement, the low pass filter being communicatively coupled for receiving the current measurement and for sending a filtered measurement value to the first difference determination unit for determining an average power difference between the filtered measurement value and the reference average output power.

3. The system of claim 1 wherein the modulation current determination unit further comprises a low pass filter for filtering high frequency noise from the determined absolute value, the low pass filter being communicatively coupled for receiving the determined absolute value and sending a filtered signal to the second difference determination unit for determining a power variance difference between the filtered signal and the reference power output variance.

4. The system of claim 1 wherein the system is implemented in a digital signal processor chip.

5. A method for maintaining a laser output signal about a reference average output power and about a reference extinction ratio comprising:
   determining a bias current and a modulation current of a laser diode drive current for a reference $P_1$ power level and for a reference $P_0$ power level;
   determining a reference average power and a reference power variance based upon the reference power levels $P_1$ and $P_0$, and
   adjusting the bias current and the modulation current simultaneously for maintaining about the reference average power and about the reference extinction ratio including the steps of:
      receiving a current measured output power value; and
      adjusting for nonlinear estimation of the current measured output power value.

6. The method of claim 5 wherein determining the bias current and the modulation current of the laser diode drive current for the reference $P_1$ power level and for the reference $P_0$ power level further comprises:

determining the bias current corresponding to the reference $P_0$ power level;

determining the bias current corresponding to the reference $P_1$ power level; and determining the modulation current corresponding to the reference $P_1$ power level as the difference between the bias current for the reference $P_1$ power level and the bias current for the reference $P_0$ power level.

7. The method of claim 5 wherein determining the reference average power and the reference power variance based upon the reference power levels $P_1$ and $P_0$ further comprises:

producing an optical power swing from the reference $P_0$ to the reference $P_1$ over a parameter estimation time period;

integrating measurement output power values received during the parameter estimation time period resulting in a bias reference current representing the reference average power; and integrating absolute power values of the received measurement output power values adjusted for nonlinear estimation during the parameter estimation time period resulting in a modulation reference current representing the reference power variance.

8. The method of claim 7 wherein integrating measurement output power values received during the parameter estimation time period resulting in the bias reference current representing the reference average power further comprises responsive to being within the parameter estimation time period, summing the current measurement with a feedback component including at least one previous measurement value.

9. The method of claim 8 wherein integrating absolute power values of the received measurement output power values adjusted for nonlinear estimation during the parameter estimation time period resulting in the modulation reference current representing the reference power variance further comprises responsive to being within the parameter estimation time period, summing the absolute value of the current measurement adjusted for nonlinear estimation with a feedback component including at least one absolute value of a previous measurement value adjusted for nonlinear estimation.

10. The method of claim 5 wherein adjusting the bias current and the modulation current simultaneously for maintaining about the reference average power and about the reference extinction ratio further includes the steps of:

determining a variation of the current measured output power value from the reference average output power;

integrating the variation of the current measured output power value with a first feedback component comprising at least one previously determined variation based on a previously measured output power value;

setting the bias current based on the result of the integration of the variation of the current measured output power value with the first feedback component;

determining a variation in an extinction ratio based upon the adjusted current measured output power value from the reference extinction ratio; integrating the variation in the extinction ratio based upon the adjusted current measured output power value with a second feedback component comprising at least one previously determined variation in the extinction ratio based on one of the previously measured output power value or another previously measured output power value; and setting the modulation current based on the result of the integration of the variation in the extinction ratio based upon the adjusted current measured output power value with the second feedback component.

11. A system for maintaining a laser output signal about a reference average output power and about a reference extinction ratio comprising:

means for determining a bias current and a modulation current of a laser diode drive current for a reference $P_1$ power level and for a reference $P_0$ power level;

means for determining a reference average power and a reference power variance based upon the reference power levels $P_1$ and $P_0$; and means for adjusting the bias current and the modulation current simultaneously for maintaining about the reference average power and about the reference extinction ratio including:

means for receiving a current measured output vower value; and means for adjusting for nonlinear estimation of the current measured output power value.

12. The system of claim 11 wherein the means for determining the bias current and the modulation current of the laser diode drive current for the reference $P_1$ power level and for the reference $P_0$ power level further comprises:

means for determining the bias current corresponding to the reference $P_0$ power level;

means for determining the bias current corresponding to the reference $P_1$ power level; and means for determining the modulation current corresponding to the reference $P_1$ power level as the difference between the bias current for the reference $P_1$ power level and the bias current for the reference $P_0$ power level.

13. The system of claim 11 wherein the means for determining the reference average power and the reference power variance based upon the reference power levels $P_1$ and $P_0$ further comprises:

means for producing an optical power swing from the reference $P_0$ to the reference $P_1$ over a parameter estimation time period;

means for integrating measurement output power values received during the parameter estimation time period resulting in a bias reference current representing the reference average power; and means for integrating absolute power values of the received measurement output power values adjusted for nonlinear estimation during the parameter estimation time period resulting in a modulation reference current representing the reference power variance.

14. The system of claim 13 wherein the means for integrating measurement output power values received during the parameter estimation time period resulting in the bias reference current representing the reference average power further comprises responsive to being within the parameter estimation time period, means for summing the current measurement with a feedback component including at least one previous measurement value.

15. The system of claim 14 wherein the means for integrating absolute power values of the received measurement output power values adjusted for nonlinear estimation during the parameter estimation time period resulting in the modulation reference current representing the reference power variance further comprises responsive to being within the parameter estimation time period, means for summing the absolute value of the current measurement adjusted for nonlinear estimation with a feedback component including at least one absolute value of a previous measurement value adjusted for nonlinear estimation.

16. The system of claim 11 wherein the means for adjusting the bias current and the modulation current simultaneously for maintaining about the reference average power and about the reference extinction ratio further includes:

means for determining a variation of the current measured output power value from the reference average output power;

means for integrating the variation of the current measured output power value with a first feedback component comprising at least one previously determined variation based on a previously measured output power value;

means for setting the bias current based on the result of the integration of the variation of the current measured output power value with the first feedback component;

means for determining a variation in an extinction ratio based upon the adjusted current measured output power value from the reference extinction ratio;

means for integrating the variation in the extinction ratio based upon the adjusted current measured output power value with a second feedback component comprising at least one previously determined variation in the extinction ratio based on the previously measured output power value or another previously measured output value; and means for setting the modulation current based on the result of the integration of the variation in the extinction ratio based upon the adjusted current measured output power value with the second feedback component.

17. A computer-usable medium comprising instructions for causing a processor to execute a method for maintaining a laser output signal about a reference average output power and about a reference extinction ratio, the method comprising:

determining a bias current and a modulation current of a laser diode drive current for a reference $P_1$ power level and for a reference $P_0$ power level;

determining a reference average power and a reference power variance based upon the reference power levels $P_1$ and $P_0$; and adjusting the bias current and the modulation current simultaneously for maintaining about the reference average power and about the reference extinction ratio including the steps of:

receiving a current measured output power value; and adjusting for nonlinear estimation of the current measured output power value.

* * * * *

UNITED STATES PATENT AND TRADEMARK OFFICE
CERTIFICATE OF CORRECTION

PATENT NO. : 6,909,731 B2  
APPLICATION NO. : 10/764380  
DATED : June 21, 2005  
INVENTOR(S) : Cheng Youn Lu Page 1 of 1

It is certified that error appears in the above-identified patent and that said Letters Patent is hereby corrected as shown below:

Title Page, please add --(73) Assignee: Centillium Communications, Inc., Fremont, CA (US)--  
Column 12, line 18, please delete the word "vower" and insert the word --power--

Signed and Sealed this

Thirtieth Day of January, 2007

JON W. DUDAS  
*Director of the United States Patent and Trademark Office*